(12) United States Patent
Sheridan et al.

(10) Patent No.: US 9,995,177 B2
(45) Date of Patent: Jun. 12, 2018

(54) SELF CLEANING DEBRIS FILTER FOR FAN DRIVE GEAR SYSTEM

(71) Applicant: United Technologies Corporation, Hartford, CT (US)

(72) Inventors: William G. Sheridan, Southington, CT (US); Alan J. Goetschius, Amston, CT (US)

(73) Assignee: United Technologies Corporation, Farmington, CT (US)

( * ) Notice: Subject to any disclaimer, the term of this patent is extended or adjusted under 35 U.S.C. 154(b) by 287 days.

(21) Appl. No.: 14/761,428

(22) PCT Filed: Feb. 19, 2014

(86) PCT No.: PCT/US2014/017025
§ 371 (c)(1),
(2) Date: Jul. 16, 2015

(87) PCT Pub. No.: WO2014/133836
PCT Pub. Date: Sep. 4, 2014

(65) Prior Publication Data
US 2016/0032772 A1  Feb. 4, 2016

Related U.S. Application Data
(60) Provisional application No. 61/770,369, filed on Feb. 28, 2013.

(51) Int. Cl.
*F01D 15/12* (2006.01)
*F01D 25/16* (2006.01)
(Continued)

(52) U.S. Cl.
CPC ............... *F01D 25/20* (2013.01); *F01D 5/02* (2013.01); *F01D 15/12* (2013.01); *F01D 25/16* (2013.01);
(Continued)

(58) Field of Classification Search
CPC .......... F01D 25/20; F01D 25/16; F01D 15/12; F05D 2260/98; F05D 2260/40311
(Continued)

(56) References Cited

U.S. PATENT DOCUMENTS 3,432,005 A    3/1969  Gates
3,489,284 A    1/1970  Pearce et al.
(Continued)

FOREIGN PATENT DOCUMENTS

EP    2253805 A2    11/2010

OTHER PUBLICATIONS

Supplementary European Search Report for European Application No. 14756659.0 dated Sep. 21, 2016.
(Continued)

*Primary Examiner* — Deming Wan
(74) *Attorney, Agent, or Firm* — Carlson, Gaskey & Olds, P.C.

(57) ABSTRACT

A pump system for a gas turbine engine has at least one pump. At least one valve has an outlet and at least one inlet is fluidly connected to the at least one pump. A geared architecture is positioned within a bearing compartment. The geared architecture is configured to receive lubricating fluid from the outlet of the at least one valve, a self-cleaning filter is positioned downstream of the at least one valve and upstream of the geared architecture. A gas turbine engine and a method are also disclosed.

22 Claims, 3 Drawing Sheets

(51) Int. Cl.
*F03B 11/08* (2006.01)
*F04D 29/70* (2006.01)
*B01D 27/06* (2006.01)
*F01M 11/03* (2006.01)
*F01D 25/20* (2006.01)
*F02C 7/06* (2006.01)
*F01D 5/02* (2006.01)
*F01M 1/10* (2006.01)

(52) U.S. Cl.
CPC ....... *F02C 7/06* (2013.01); *F01M 2001/1021* (2013.01); *F05D 2220/32* (2013.01); *F05D 2220/36* (2013.01); *F05D 2240/54* (2013.01); *F05D 2240/60* (2013.01); *F05D 2260/40311* (2013.01); *F05D 2260/98* (2013.01)

(58) Field of Classification Search
USPC ....... 415/122.1, 110, 112; 210/167.02, 323.1
See application file for complete search history.

(56) References Cited

U.S. PATENT DOCUMENTS

| | | | |
|---|---|---|---|
| 3,516,547 A | 6/1970 | Bishop | |
| 4,456,425 A | 6/1984 | McCarty et al. | |
| 4,525,995 A | 7/1985 | Clark | |
| 4,905,644 A | 3/1990 | Masclet | |
| 4,950,400 A * | 8/1990 | Girondi | B01D 27/144 210/335 |
| 5,610,341 A | 3/1997 | Tortora | |
| 5,814,215 A * | 9/1998 | Bruss | B01D 29/15 210/130 |
| 6,378,293 B1 | 4/2002 | Care et al. | |
| 7,426,834 B2 | 9/2008 | Granitz et al. | |
| 7,640,723 B2 | 1/2010 | Alexander | |
| 7,937,946 B1 | 5/2011 | Harris et al. | |
| 8,222,344 B2 | 7/2012 | Jin et al. | |
| 8,230,974 B2 * | 7/2012 | Parnin | F01D 25/18 184/6.11 |
| 8,246,503 B2 | 8/2012 | Sheridan et al. | |
| 8,261,527 B1 | 9/2012 | Stearns et al. | |
| 2009/0107904 A1* | 4/2009 | Mangano | B01D 29/23 210/232 |
| 2010/0212281 A1* | 8/2010 | Sheridan | F01D 25/20 60/39.08 |
| 2010/0317478 A1 | 12/2010 | McCune et al. | |
| 2012/0275904 A1 | 11/2012 | McCune et al. | |

OTHER PUBLICATIONS

International Preliminary Report on Patentability for International Application No. PCT/US2014/017025 dated Sep. 11, 2015.

The International Search Report and Written Opinion for PCT Application No. PCT/US2014/017025, dated Jun. 9, 2014.

* cited by examiner

SELF CLEANING DEBRIS FILTER FOR FAN DRIVE GEAR SYSTEM

This application claims priority to U.S. Provisional Application No. 61/770,369, filed Feb. 28, 2013.

BACKGROUND

In many gas turbine engines, a low pressure spool includes a low pressure turbine that is connected to and drives a low pressure compressor, and a high pressure spool includes a high pressure turbine that is connected to and drives a high pressure compressor. In certain configurations, the low pressure spool drives a fan via a geared architecture. A lubrication system includes a main pump that is driven by the high pressure spool to pump lubricating and cooling liquid to engine components as needed.

Some gas turbine engines include a windmill emergency oil system to protect the fan drive gear system under low or no oil conditions. For example, when the high pressure spool stops rotating or rotates at a reduced rpm (revolutions per minute), the fan drive gear system can continue rotating even though the main pump will ordinarily provide little or no liquid during this time. Such a situation can arise when the wind rotates the fan and corresponding gears and bearings while the aircraft is parked on the ground, or during an in-flight engine shutdown. The windmill emergency oil system operates to protect gears and bearings from damage during the relatively short periods of non-lubricated operation.

Over time, these lubrication systems can become clogged with debris. In certain applications a filter has been installed to protect bearings within the fan drive system from debris. One problem with existing filters is that the filter permanently traps debris such that the debris remains in place until the fan drive gear system is overhauled. Further, in one known configuration, the filter is located within the fan drive gear system bearing journals such that the entire engine needs to be disassembled to remove and change the filter. Another problem with existing systems is that upon engine start-up and shut-down, the windmill system can send unfiltered lubrication to the journal bearings, which further clogs the filters with debris over time.

SUMMARY

In a featured embodiment, a pump system for a gas turbine engine has at least one pump, at least one valve having an outlet and at least one inlet fluidly connected to the at least one pump. A geared architecture is positioned within a bearing compartment, and is configured to receive lubricating fluid from the outlet of the at least one valve. A self-cleaning filter is positioned downstream of the at least one valve and upstream of the geared architecture.

In another embodiment according to the previous embodiment, the self-cleaning filter comprises a filter screen positioned within a filter housing. The filter housing has a filter inlet fluidly connected to the outlet of the at least one valve. A first outlet is fluidly connected to the geared architecture. A second outlet is fluidly connected to the bearing compartment.

In another embodiment according to any of the previous embodiments, fluid flows into the filter inlet at a first flow rate and flows out of the first outlet at a flow rate that is less than the first flow rate.

In another embodiment according to any of the previous embodiments, fluid flows out of the second outlet at a third flow rate that is less than the second flow rate.

In another embodiment according to any of the previous embodiments, the second flow rate is approximately 95% of the first flow rate.

In another embodiment according to any of the previous embodiments, the filter screen is set to filter to a level comprising approximately 75 microns.

In another embodiment according to any of the previous embodiments, the at least one inlet of the at least one valve comprises a first valve inlet fluidly connected to a main pump and a second valve inlet fluidly connected to an auxiliary pump.

In another embodiment according to any of the previous embodiments, the at least one valve comprises a first valve fluidly connecting the auxiliary pump to an auxiliary reservoir and a second valve fluidly connecting the main pump to the geared architecture.

In another embodiment according to any of the previous embodiments, the second valve includes the outlet to the self-cleaning filter and includes an additional outlet fluidly connected to a main reservoir.

In another embodiment according to any of the previous embodiments, during a first condition, fluid flows from the main reservoir, through the main pump, through the first valve inlet of the second valve, through the self-cleaning filter, and into the geared architecture. During a second condition, fluid flows from the auxiliary reservoir, through the first valve and into the auxiliary pump, through the second valve inlet to the second valve, through the self-cleaning filter, and into the geared architecture.

In another embodiment according to any of the previous embodiments, fluid washes over the screen to remove collected debris and exits the second outlet of the self-cleaning filter to return fluid to the bearing compartment during the first and second conditions.

In another embodiment according to any of the previous embodiments, including a main supply passage fluidly connecting the main pump to the first valve inlet of the second valve. The first condition has a normal operational pressure level in the main supply passage and the second condition has a low operational pressure level in the main supply passage.

In another embodiment according to any of the previous embodiments, the geared architecture includes a plurality of gears supported by journal bearings. The first outlet of the filter housing is fluidly connected to lubricate the journal bearings.

In another featured embodiment, a gas turbine engine has a fan section including a fan shaft. A first spool includes a first shaft that connects the fan section and a first compressor section to a first turbine section. A second spool includes a second shaft that connects a second compressor section to a second turbine section. The first and second shafts rotate at different speeds. A geared architecture couples the first shaft to the fan shaft. A lubrication system includes at least one pump, at least one valve having at least one inlet fluidly connected to the at least one pump and an outlet, a bearing compartment for the geared architecture such that the geared architecture is configured to receive lubricating fluid from the outlet of the at least one valve, and a self-cleaning filter positioned downstream of the at least one valve and upstream of the geared architecture.

In another embodiment according to the previous embodiment, the geared architecture includes a plurality of gears supported by journal bearings. The filter includes an outlet that is fluidly connected to lubricate the journal bearings.

In another embodiment according to any of the previous embodiments, the self-cleaning filter has a filter screen positioned within a filter housing. The filter housing has a filter inlet fluidly connected to the outlet of the at least one valve. A first outlet is fluidly connected to the geared architecture. A second outlet is fluidly connected to the bearing compartment. The fluid flows into the filter inlet at a first flow rate and flows out of the first outlet at a flow rate that is less than the first flow rate. The fluid flows out of the second outlet at a third flow rate that is less than the second flow rate.

In another embodiment according to any of the previous embodiments, fluid enters the filter housing via the filter inlet. A first portion of the fluid is filtered through the filter screen and exits the first outlet to provide filtered fluid to journal bearings of the geared architecture. A second portion of the fluid washes over the filter screen to remove collected debris and exits the second outlet of the self-cleaning filter to return the fluid and associated debris to the bearing compartment.

In another embodiment according to any of the previous embodiments, the first portion of fluid is significantly greater than the second portion of fluid.

In another featured embodiment, a method of cleaning a filter in a pump system for a gas turbine engine includes the steps of providing a self-cleaning filter having an inlet, a first outlet, and a second outlet. The inlet to a fluid supply associated with at least one of a main reservoir and an auxiliary reservoir is fluidly connected. The first outlet to lubricate bearings of a geared architecture that couples an engine shaft to a fan shaft is fluidly connected. The second outlet is fluidly connected to return collected debris to a bearing compartment that receives the geared architecture.

In another embodiment according to any of the previous embodiments, the self-cleaning filter has a housing defining an internal cavity and a filter screen positioned within the internal cavity, and includes the steps of receiving fluid at the inlet at a first flow rate, filtering a portion of the fluid through the filter screen, directing the filtered fluid to the first outlet at a second flow rate less than the first flow rate, and washing a remaining portion of the fluid over the filter screen to remove collected debris, with the remaining fluid and associated debris exiting the second outlet at a third flow rate less than the second flow rate.

BRIEF DESCRIPTION OF THE DRAWINGS

The disclosure can be further understood by reference to the following detailed description when considered in connection with the accompanying drawings wherein.

DETAILED DESCRIPTION

Figure 1:
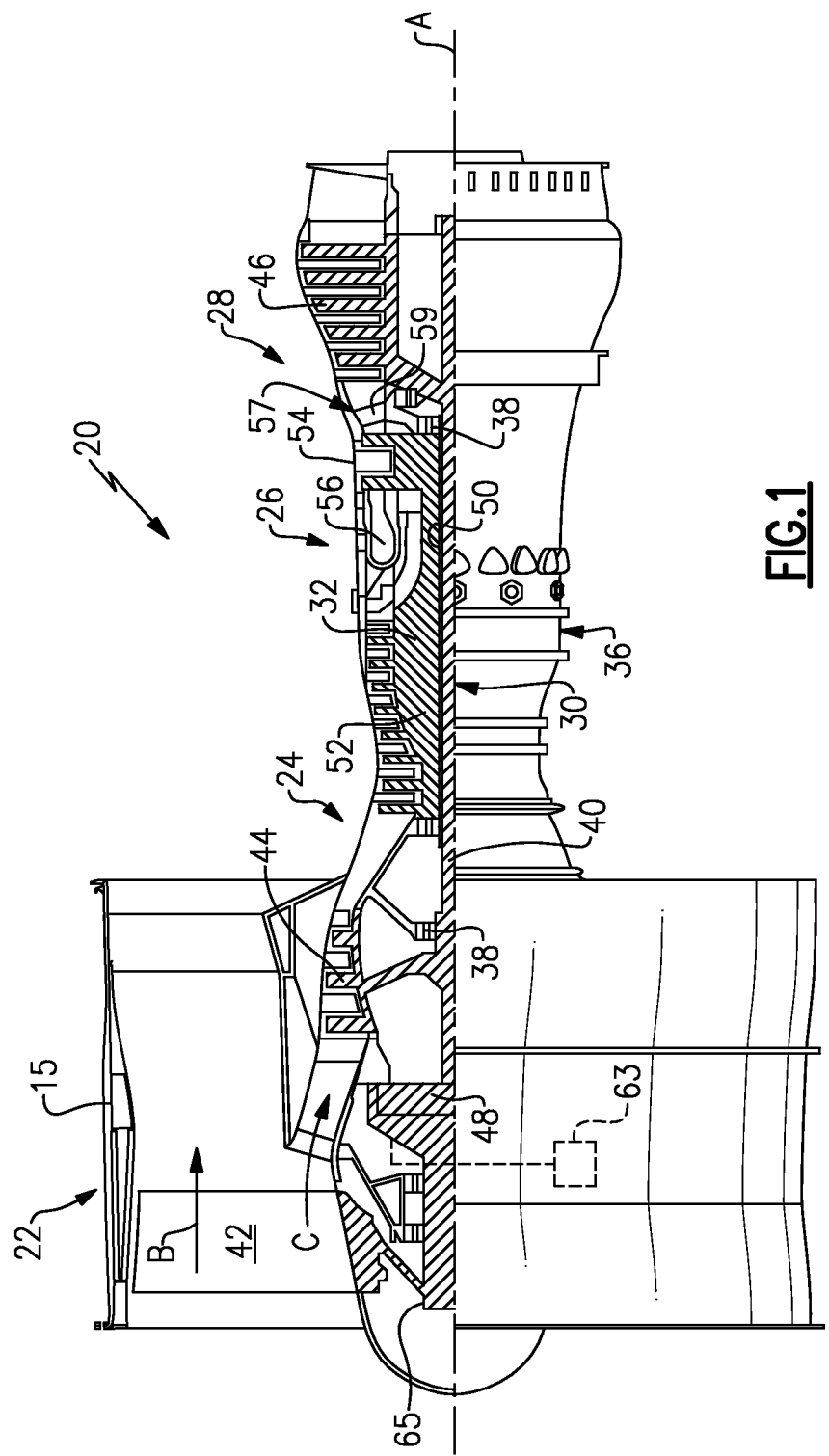
FIG. 1 schematically illustrates a geared turbofan engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 31 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compress section 24, combustor section 26, turbine section 28, and fan drive gear system 50 may be varied. For example, gear system 50 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° \ R)]^{0.5}$. The "Low corrected fan tip speed" as disclosed herein according to one non-limiting embodiment is less than about 1150 ft/second.

Figure 2:
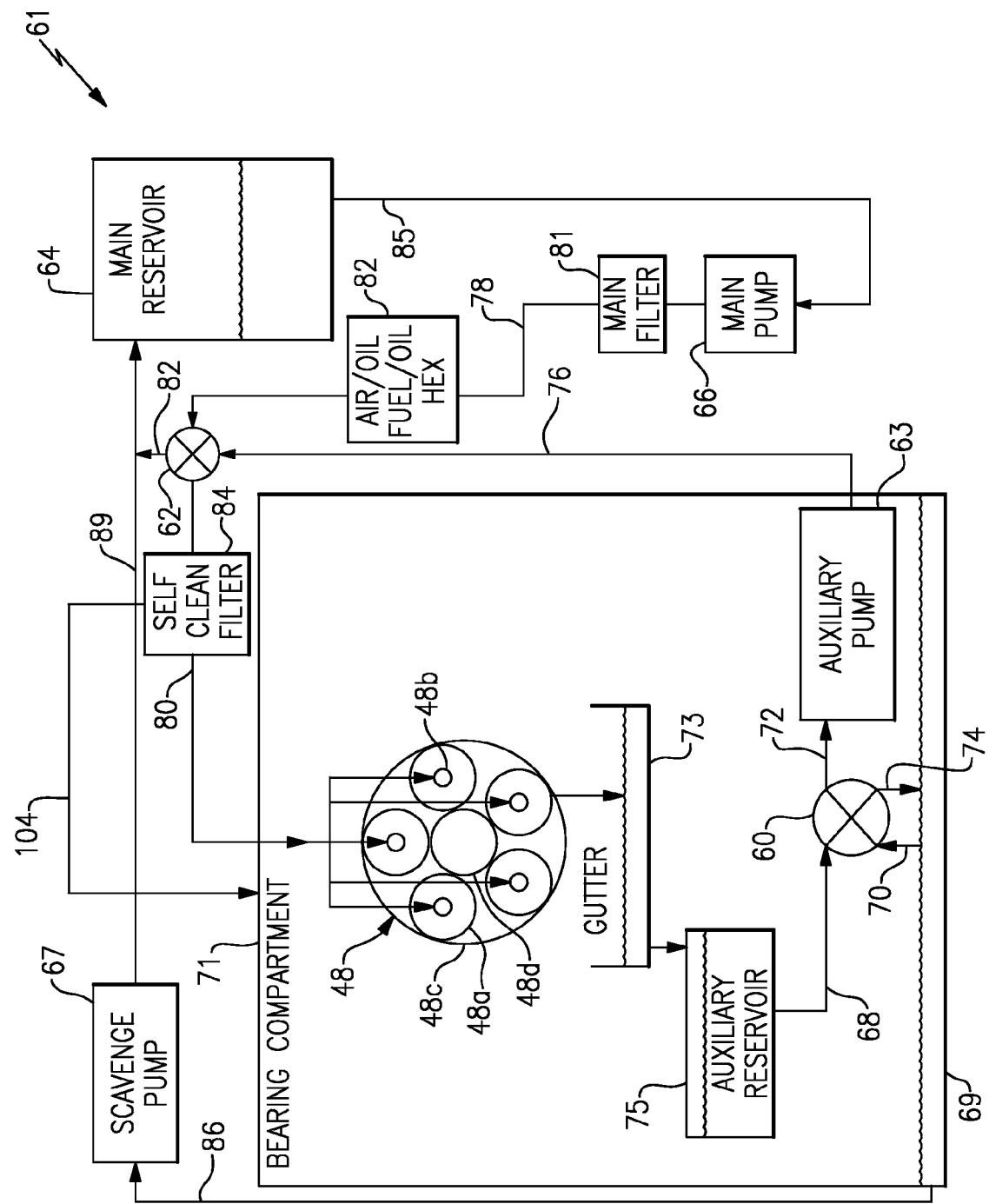
FIG. 2 is a schematic view of a pump system of the present invention.

As shown in FIG. 2, a pump system 61 includes a main pump 66 and an auxiliary pump 63. The auxiliary pump, shown schematically in FIG. 1, is coupled to and is driven by fan shaft 65 such that the pump 63 can operate whenever the fan shaft 65, which is driven by the geared architecture 48, is rotating. The auxiliary pump 63 supplies liquid, such as oil, to lubricate gears and bearings of the geared architecture 48 of the fan drive gear system. The fan drive gear system benefits from a relatively continuous supply of lubricating liquid whenever fan shaft 65 is rotating. At least some of the liquid supplied to fan drive gear system drains to a sump 69 (FIG. 2) and is eventually pumped back through the pump 63.

As shown in FIG. 2, the pump system 61 includes a bearing compartment 71 having a compartment cavity that includes the geared architecture 48 of the fan drive gear system. In one example, the geared architecture 48 comprises star gears 48a supported on bearings 48b, a ring gear 48c, and a sun gear 48d. The structure and operation of this configuration of the geared architecture is known and will not be discussed in detail. Further, this is just one example of a geared architecture, and it should be understood that other configurations could also be used.

In addition to the auxiliary pump 63 and main pump 66, the pump system 61 also includes a gutter 73, an auxiliary reservoir 75, a first shuttle valve 60, a second shuttle valve 62, a main reservoir 64, and a scavenge pump 67 positioned outside of bearing compartment 71. Passages 68, 70, 72, 74, 76, 78, 80, 82, 85, 86, and -89 connect the various components as illustrated and as further described, below.

As the fan drive gear system rotates, lubricating liquid drips or flies off the geared architecture 48 into bearing compartment 71 in different directions. A portion of that liquid is caught and collected by the gutter 73 and is funneled to the auxiliary reservoir 75. During normal operating conditions, the auxiliary reservoir 75 is kept substantially full of liquid for later use. In one example, the auxiliary reservoir 75 holds enough liquid to provide adequate lubrication for the fan drive gear system for at least 10 seconds. The gutter 73 does not collect all liquid leaving fan drive gear system. The remaining liquid that is not collected by gutter 73 falls to sump 69, which is an open-top reservoir at a bottom of the bearing compartment 71. The bearing compartment 71 can be sealed to reduce liquid flow out of bearing compartment 71, except through designated passages as herein described.

The first shuttle valve 60 is fluidically connected to the auxiliary reservoir 75 via a first passage 68, to sump 69 via a second passage 70, to auxiliary pump 63 via a third passage 72, and again to sump 69 via a fourth passage 74. The second shuttle valve 62 is fluidically connected to auxiliary pump 63 via a fifth passage 76, to main pump 66 via a sixth passage 78, to bearings 48b via a seventh passage 80, and to main reservoir 64 via eighth and ninth passages 82 and 89. In the example configuration, the fifth passage 76 is an auxiliary supply passage and the sixth passage 78 is a main supply passage. The main reservoir 64 is further connected to the main pump 66 through a tenth passage -85. The scavenge pump 67 is connected to sump 69 via an eleventh passage 86 and to the main reservoir 64 via the ninth passage 89. The scavenge pump 67 pumps a portion of the liquid in sump 69 to the main reservoir 64 for use by the main pump 66.

As part of pump system 61, the first shuttle valve 60 and second shuttle valve 62 work together as a valve system. This valve system directs lubricating liquid to bearings 48b from one of the sump 69, auxiliary reservoir 58, or main reservoir 64. The pump system 61 selects among these potential sources of lubricating liquid based upon sensed engine operating conditions. The operation of the pump system 61 and the associated first 60 and second 62 shuttle valves is described in detail in U.S. Pat. No. 8,230,974, which is assigned to the assignee of the present disclosure, and which is herein incorporated by reference.

The pump system 61 also includes a main filter 81, one or more heat exchangers 82, and a self-cleaning filter 84. As shown in FIG. 2, oil leaving the main pump 66 goes through the main filter 81, which is located in the sixth passage 78, and then enters a set of heat exchangers (HEX) 82. In one example, the heat exchangers 82 can include fuel/oil and air/oil configurations; however, other combinations of heat exchangers could also be used. The main oil is directed to the second shuttle valve 62 after exiting the heat exchangers 82. If the pressure in the main supply, i.e. the sixth passage 78, is low, then windmill oil will be directed to the journal bearings 48b via the auxiliary, i.e. fifth passage 76. If the pressure in the main supply passage 78 is normal, then the main oil will be directed to the journal bearings 48b and windmill oil will be sent to the main reservoir via the fifth and ninth passages 76, 89 to be recycled within the oil system.

Figure 3:
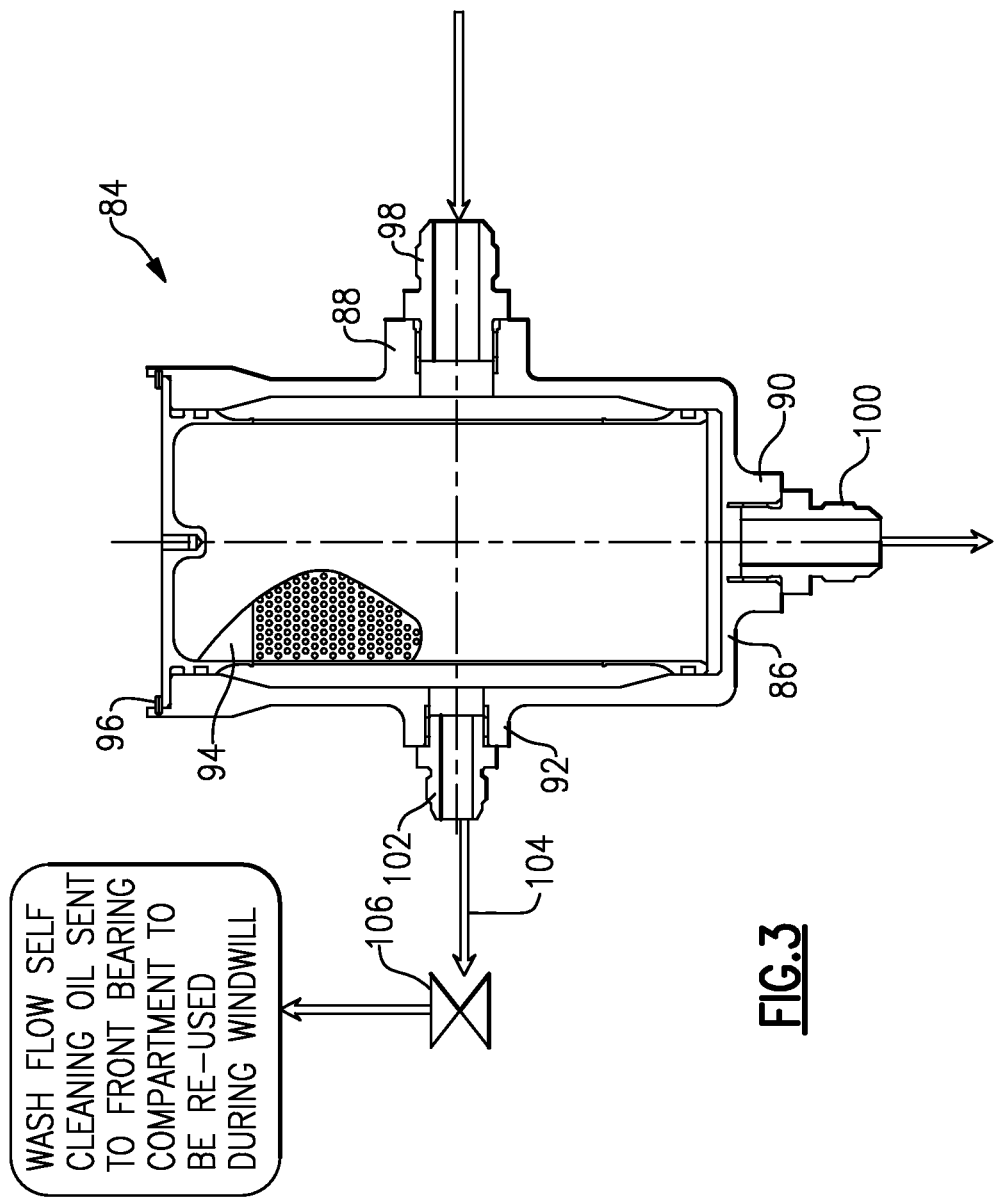
FIG. 3 is a partial section view of a self-cleaning filter as used in the pump system of FIG. 2.

The self-cleaning filter 84 is positioned in the seventh passage 80 downstream of the second shuttle valve 62. This filter 84 removes debris from the oil prior to lubricating the bearing journals. The self-cleaning filter 84 is shown in greater detail in FIG. 3.

The self-cleaning filter 84 includes a filter housing 86, defining an internal cavity, and having an inlet 88 and first 90 and second 92 outlets. An oil screen 94 is inserted into the internal cavity and is secured to the filter housing 86 with a retainer 96. In one example, the retainer 96 comprises a snap ring; however, other retainers could also be used. The oil screen 94 includes a plurality of screen holes that can be set to filter the oil to a desired particle size. In one example configuration, the screen is set to filter oil to 75 microns.

The inlet 88 receives a connector 98 for connection to main line 78. The line 78 is slightly oversized compared to prior lines to provide a slight overflow condition at the inlet 88. The first outlet 90 receives a connector 100 for connection to the seventh passage 80 to the bearings 48b. Oil flows through the inlet 88, debris is collected on the screen 94, and the filtered oil is directed to the first outlet 90.

The second outlet 92 has a connector 102 that is connected to a twelfth passage 104 (FIG. 2), which returns any oil not exiting from the first outlet 90 to the bearing compartment 71. A restrictor 106 is positioned within the twelfth passage 104 to set the amount of flow. In one example, the inlet flow is approximately 105 lbs/min and the outlet flow to the bearings 48b at the first outlet 90 is 100 lbs/min. As such, the outlet flow to the bearings 48b is less than the inlet flow by approximately 5 lbs/min. This difference is set by the restrictor 106, which then allows the remaining oil to exit the second outlet at a flow rate of 5 lbs/min. The excess flow washes over the screen 94 and removes the collected debris. This oil and debris then exit the housing via the second outlet 92 and is returned to the bearing compartment.

The housing 86 is configured to be mounted externally to the engine cases such that the filter is easily accessible without having to disassemble the engine. The filter 84 is also compact in size such that only a small amount of packaging space is required. In one example, the filter is approximately six inches by three inches. Debris collects on the screen 94 such that it is not introduced into the bearings 48b. The debris collected on the screen 94 is washed off by the oil flow and returned to the bearing compartment. Due to the self-cleaning nature of the filter, maintenance is not required; however, due to the location the screen 94 can be easily removed by releasing the snap ring and pulling the filter out with an appropriate tool.

The subject self-cleaning filter 84 protects the journal bearings 48b while sending the residual debris to a safe engine area that is less sensitive to contamination. Further, this filter 84 is located outside of the engine cases so that the filter can be easily removed and inspected; however, due to the self-cleaning feature the filter should not require periodic maintenance. Thus, the filter system will provide additional projection for the journal bearings without the need for periodic maintenance or the concern of clogging filters buried deep within the engine architecture and not easily accessed.

Although an example embodiment has been disclosed, a worker of ordinary skill in this art would recognize that certain modifications would come within the scope of the claims. For that reason, the following claims should be studied to determine their true scope and content.

What is claimed is:

1. A method of cleaning a filter in a pump system for a gas turbine engine comprising steps of:
providing a self-cleaning filter comprising a filter screen held fixed within a filter housing having an inlet, a first outlet, and a second outlet;
fluidly connecting the inlet to a fluid supply associated with at least one of a main reservoir and an auxiliary reservoir;
fluidly connecting the first outlet to lubricate bearings of a geared architecture that couples an engine shaft to a fan shaft; and
fluidly connecting the second outlet to return collected debris to a bearing compartment that receives the geared architecture.

2. The method according to claim 1 wherein the filter housing defines an internal cavity with the filter screen being positioned within the internal cavity and held fixed to the filter housing with at least one retainer, and including steps of
receiving fluid at the inlet at a first flow rate,
filtering a portion of the fluid through the filter screen,
directing the portion of the fluid to the first outlet at a second flow rate less than the first flow rate, and
washing a remaining portion of the fluid over the filter screen to remove collected debris, with the remaining portion of the fluid and the collected debris exiting the second outlet at a third flow rate less than the second flow rate.

3. The method according to claim 1 including positioning a restrictor downstream of the second outlet to set a specified flow rate difference between the inlet and the first outlet.

4. A pump system for a gas turbine engine comprising:
at least one pump;
at least one valve having an outlet and at least one inlet fluidly connected to the at least one pump; a geared architecture positioned within a bearing compartment, wherein the geared architecture is configured to receive lubricating fluid from the outlet of the at least one valve; and
a self-cleaning filter positioned downstream of the at least one valve and upstream of the geared architecture, wherein the self-cleaning filter comprises a filter screen held fixed within a filter housing, and wherein the filter housing has a filter inlet, a first outlet fluidly connected to the geared architecture, and a second outlet fluidly connected to the bearing compartment, and including a restrictor downstream of the second outlet to set a specified flow rate difference between the filter inlet and the first outlet.

5. A pump system for a gas turbine engine comprising:
at least one pump;
at least one valve having an outlet and at least one inlet fluidly connected to the at least one pump;
a geared architecture positioned within a bearing compartment, wherein the geared architecture is configured to receive lubricating fluid from the outlet of the at least one valve;
a self-cleaning filter positioned downstream of the at least one valve and upstream of the geared architecture, wherein the self-cleaning filter comprises a filter screen held fixed within a filter housing; and
wherein the filter screen is fixed to the filter housing with at least one retainer, and wherein the filter housing has a filter inlet fluidly connected to the outlet of the at least one valve, a first outlet fluidly connected to the geared architecture, and a second outlet fluidly connected to the bearing compartment.

6. The pump system according to claim 5 wherein the lubricating fluid flows into the filter inlet at a first flow rate and flows out of the first outlet at a second flow rate that is less than the first flow rate.

7. The pump system according to claim 6 wherein the lubricating fluid flows out of the second outlet at a third flow rate that is less than the second flow rate.

8. The pump system according to claim 7 wherein the second flow rate is approximately 95% of the first flow rate.

9. The pump system according to claim 5 wherein the filter screen is set to filter to a level comprising approximately 75 microns.

10. The pump system according to claim 5 wherein the at least one inlet of the at least one valve comprises a first valve inlet fluidly connected to a main pump and a second valve inlet fluidly connected to an auxiliary pump.

11. The pump system according to claim 10 wherein the at least one valve comprises a first valve fluidly connecting the auxiliary pump to an auxiliary reservoir and a second valve fluidly connecting the main pump to the geared architecture.

12. The pump system according to claim 11 wherein the second valve includes the outlet to the self-cleaning filter and includes an additional outlet fluidly connected to a main reservoir.

13. The pump system according to claim 12 wherein during a first condition the lubricating fluid flows from the main reservoir, through the main pump, through the first valve inlet of the second valve, through the self-cleaning filter, and into the geared architecture, and wherein during a second condition the lubricating fluid flows from the auxiliary reservoir, through the first valve and into the auxiliary pump, through the second valve inlet to the second valve, through the self-cleaning filter, and into the geared architecture.

14. The pump system according to claim 13 where in the lubricating fluid washes over the filter screen to remove collected debris and exits the second outlet of the self-cleaning filter to return the lubricating fluid to the bearing compartment during the first and second conditions.

15. The pump system according to claim 13 including a main supply passage fluidly connecting the main pump to the first valve inlet of the second valve, and wherein the first condition comprises a normal operational pressure level in the main supply passage and the second condition comprises a low operational pressure level in the main supply passage.

16. The pump system according to claim 15 wherein the geared architecture includes a plurality of gears supported by journal bearings, and wherein the first outlet of the filter housing is fluidly connected to lubricate the journal bearings.

17. A gas turbine engine comprising:
a fan section including a fan shaft;
a first spool including a first shaft that connects the fan section and a first compressor section to a first turbine section;
a second spool including a second shaft that connects a second compressor section to a second turbine section, the first and second shafts rotating a different speeds;
a geared architecture coupling the first shaft to the fan shaft; and
a lubrication system including
at least one pump,
at least one valve having at least one inlet fluidly connected to the at least one pump and an outlet,
a bearing compartment for the geared architecture such that the geared architecture is configured to receive lubricating fluid from the outlet of the at least one valve, and
a self-cleaning filter positioned downstream of the at least one valve and upstream of the geared architecture, wherein the self-cleaning filter comprises a filter screen held fixed within a filter housing, and wherein the filter housing has a filter inlet, a first outlet fluidly connected to the geared architecture, and a second outlet fluidly connected to the bearing compartment, and including a restrictor downstream of the second outlet to set a specified flow rate difference between the filter inlet and the first outlet.

18. The gas turbine engine according to claim 17 wherein the geared architecture includes a plurality of gears supported by journal bearings, and wherein the self-cleaning filter includes the first outlet that is fluidly connected to lubricate the journal bearings.

19. The gas turbine engine according to claim 17 wherein the filter screen is held fixed to the filter housing with at least one retainer.

20. A gas turbine engine comprising:
a fan section including a fan shaft;
a first spool including a first shaft that connects the fan section and a first compressor section to a first turbine section;
a second spool including a second shaft that connects a second compressor section to a second turbine section, the first and second shafts rotating a different speeds;
a geared architecture coupling the first shaft to the fan shaft; and
a lubrication system including
at least one pump,
at least one valve having at least one inlet fluidly connected to the at least one pump and an outlet,
a bearing compartment for the geared architecture such that the geared architecture is configured to receive lubricating fluid from the outlet of the at least one valve, and
a self-cleaning filter positioned downstream of the at least one valve and upstream of the geared architecture, and wherein the self-cleaning filter comprises a filter screen positioned within a filter housing, and wherein the filter housing has a filter inlet fluidly connected to the outlet of the at least one valve, a first outlet fluidly connected to the geared architecture, and a second outlet fluidly connected to the bearing compartment, and wherein the lubricating fluid flows into the filter inlet at a first flow rate and flows out of the first outlet at a second flow rate that is less than the first flow rate, and wherein the lubricating fluid flows out of the second outlet at a third flow rate that is less than the second flow rate.

21. The gas turbine engine according to claim 20 wherein the lubricating fluid enters the filter housing via the filter inlet, and wherein a first portion of the lubricating fluid is filtered through the filter screen and exits the first outlet to provide filtered the lubricating fluid to journal bearings of the geared architecture, and wherein a second portion of the lubricating fluid washes over the filter screen to remove collected debris and exits the second outlet of the self-cleaning filter to return the lubricating fluid and collected debris to the bearing compartment.

22. The gas turbine engine according to claim 21 wherein the first portion of the lubricating fluid is significantly greater than the second portion of the lubricating fluid.

* * * * *

UNITED STATES PATENT AND TRADEMARK OFFICE
CERTIFICATE OF CORRECTION

PATENT NO. : 9,995,177 B2
APPLICATION NO. : 14/761428
DATED : June 12, 2018
INVENTOR(S) : William G. Sheridan and Alan J. Goetschius Page 1 of 1

It is certified that error appears in the above-identified patent and that said Letters Patent is hereby corrected as shown below:

In the Claims

In Claim 2, Column 8, Line 2-3; replace "steps of" with --steps of:--

In Claim 14, Column 9, Line 20; replace "where in" with --wherein--

In Claim 17, Column 9, Line 43; replace "rotating a different speeds" with --rotating at different speeds--

In Claim 17, Column 9, Line 46; replace "including" with --including:--

In Claim 20, Column 10, Line 20; "rotating a different speeds;" with --rotating at different speeds;--

In Claim 21, Column 10, Line 49; "filtered the lubricating fluid" with --filtered lubricating fluid--

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*